3,352,180
CIRCULAR SAW GUMMING AND TOOTH SHAPING APPARATUS

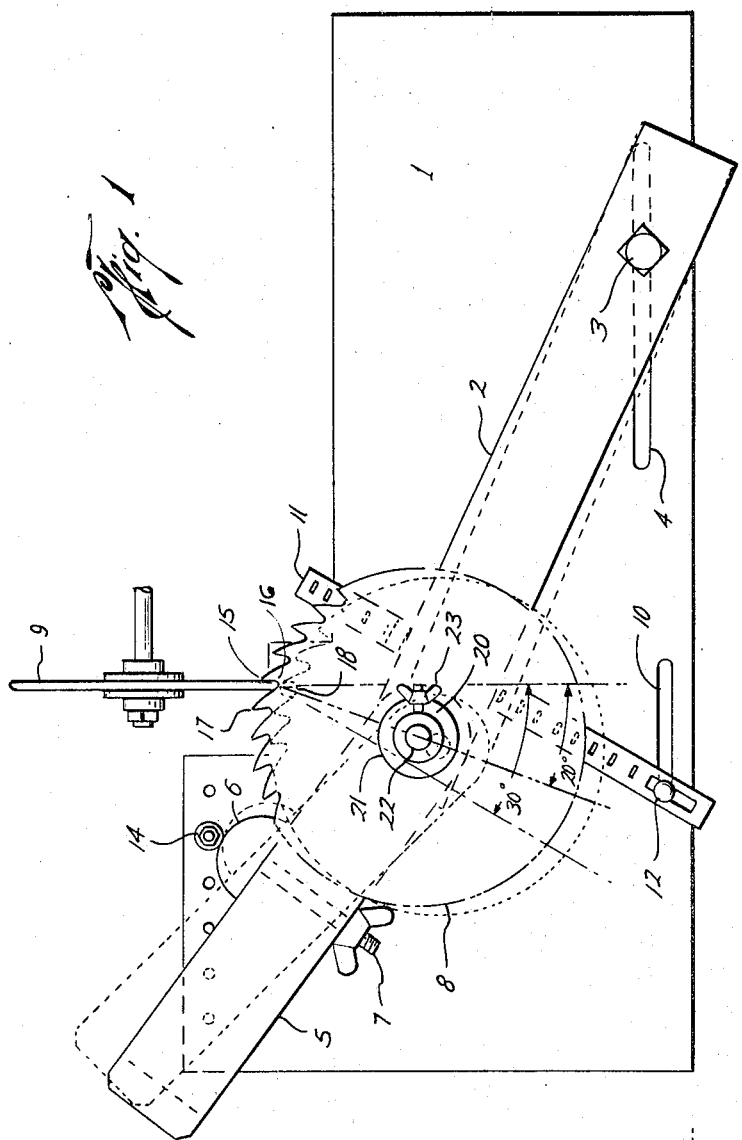

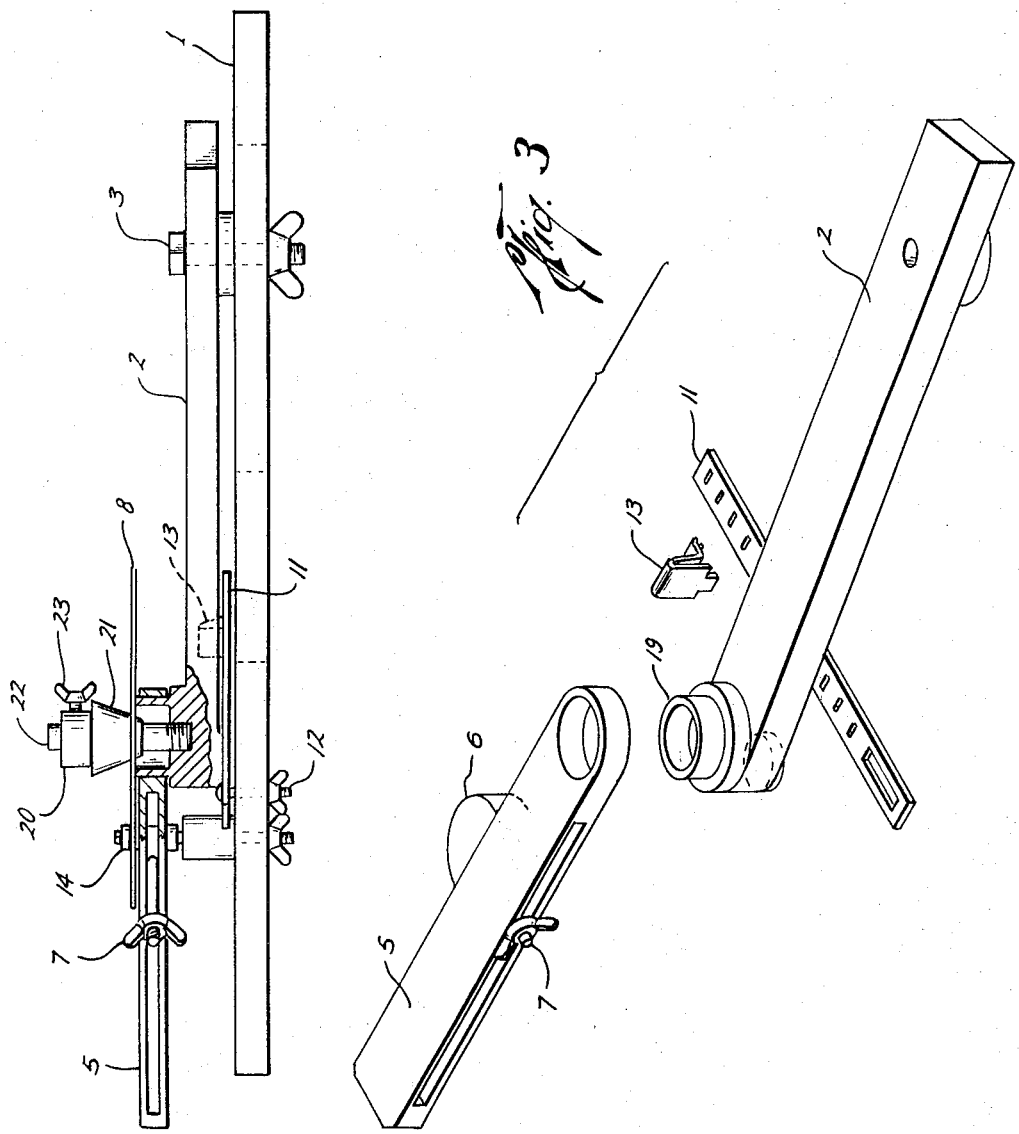

Theo Rasmussen, 5217 Ave. P, Galveston, Tex. 77550
Filed Aug. 9, 1965, Ser. No. 478,152
3 Claims. (Cl. 76—42)

ABSTRACT OF THE DISCLOSURE

An apparatus for jointing, gumming and shaping the saw teeth of a circular saw blade which comprises a portable base plate, a circular saw blade supporting structure mounted on said base plate including an elongated first arm adjustably attached at one end thereof to said base plate and rotatably attached at the other end thereof to an elongated second arm, means for clamping the center of said saw blade at the point of attachment between said first arm and said second arm, means for stopping the movement of said first arm towards a grinding wheel mounted adjacent to said base plate, means for supporting the perimeter of the said saw blade during grinding of the teeth, said apparatus designed to accurately grind the face and back of the teeth of a circular saw blade with the desired hook and curvature.

---

This invention relates to an improved apparatus for gumming, jointing and shaping of the teeth of circular saw blades and more particularly is related to an apparatus which can be used in an ordinary home shop in conjunction with a grinding wheel to accurately and precisely gum, joint, and shape the teeth of a circular saw blade.

There are many persons who wish to grind, shape and sharpen circular saws either for their own purposes, or on a small commercial scale, but can not do so because existing machines are much too expensive and require expertness inconsistent with the ordinary amateur craftsman. However, nearly all such persons own or have access to an ordinary grinding wheel which can be modified to move backward and forward for a short distance by rocking it over a pivot point, by installing ball bearing rollers or by using angle iron guides with fixed balls for the slide contact on which it can move forward and backward.

Although many home circular saw sharpening devices are designed to successfully grind the face or leading edge of the teeth of a circular saw blade, none of them are equipped to smoothly and accurately joint the saw teeth and to shape the gullet and back or trailing edge of the teeth. Thus depending upon the skill of the craftsman, the back edge of the saw teeth and the height of the teeth are likely to never be the same from point to point. Furthermore, for a circular saw blade designed for ripping or for combination ripping and cross cutting, a curvature on the back of the saw teeth is required.

It is therefore, an object of the present invention to provide an apparatus for gumming, jointing, and shaping of the teeth of a circular saw blade which may be used by the amateur craftsman, thus avoiding the necessity of taking the saw to a specialist.

More specifically it is an object to provide a circular saw blade gumming, jointing and tooth shaping apparatus which may be manipulated by the user to gum, joint and shape the saw teeth accurately and which may be adjusted to proper angles suitable for obtaining a cutting angle or hook on the face of the saw teeth of a circular saw desirable for that particular saw together with a smooth and properly shaped back and gullet of said saw teeth.

Yet another object of the present invention is to provide a circular saw blade grinding table which may be manipulated with reference to a grinding wheel so that the face and the gullet of each saw tooth as well as the back of the next preceding saw tooth are accurately and precisely ground to the desired angle and shape in one action without depending upon the skill of the operator or an automatic sharpening machine.

Other objects and advantages of this invention will become apparent to those skilled in the art from the following description, drawing, and appended claims.

The accompanying drawings will illustrate the apparatus of this invention but are not to be construed as limiting it in any manner whatsoever. FIGURE 1 shows a plan view of the apparatus of the present invention with all of the essential parts of the apparatus but showing only the grinding wheel of the grinding machine. FIGURE 2 is a side view of the apparatus showing the assembly of the various parts. FIGURE 3 is an isometric view of four of the essential parts of the apparatus shown in more detail than FIGURES 1 and 2.

Referring now to FIGURE 1, base plate 1 contains all of the parts of the apparatus essential to the correct jointing, gumming and shaping of the saw teeth of a circular saw blade. Arm 2 is clamped to base plate 1 by means of hand bolt 3 through slot 4 and may be clamped along the length of slot 4, depending on the angle or hook desired on the face of saw tooth 15. Arm 2 is rotatably fastened to forearm 5 by means of socket 19 (see FIGURE 3). Circular saw blade 8 is firmly fastened to forearm 5 by means of cone 21, clamp 20 and set screw 23 all of which are mounted axially to shaft 22 with circular saw blade 8. Adjustable stop fastener 11 is mounted on base plate 1 by means of screw 12 through slot 10 and has attached to it stop 13 against which arm 2 is firmly pressed during the jointing, shaping and gumming operation so that the sharpening of saw teeth 15 can be precisely controlled as to the hook of the face of saw tooth 15 and the shaping of gullet 16 and the back of saw tooth 15. Attached to forearm 5 by means of bolt 7 is key 6 which is generally semi-circular in shape and may have a radius of from one to several inches. Key guide 14 is designed for key 6 to be pressed against it during the grinding operation. Grinding wheel 9 is shown in position of deepest penetration of the saw blade 8 when gumming or sharpening the face of saw tooth 15 and shaping gullet 16. Grinding wheel 9 is driven by an electric motor (not shown) which is mounted on a frame (not shown) which can easily be moved forward and backward. Saw rest 18 maintains stability of saw blade 8 during the grinding operation and eliminates vibration. Saw rest 18 is fastened securely to base 1 and projects upward to support the outer edge of saw blade 8 at the same height as the remainder of the saw blade.

As an example, in the operation of the apparatus of the present invention to sharpen or joint, gum and shape the teeth of a circular saw blade, first saw blade 8 is firmly clamped to arm 5 with cone 21, clamp 20 and set screw 23. Then arm 2 and stop 13 are adjusted in slot 4 and on stop fastener 11 for the proper angle of hook for the face of saw tooth 15, for instance, 20 degrees from the diameter of the saw blade as is shown in FIGURE 1. Stop 13 is snapped onto stop fastener 11 in any one of the notches depending on the depth of the saw teeth. Likewise the fine setting made in slot 10 of bolt 12 depends on the exact depth of the teeth in saw blade 8. The location of bolt 3 in slot 4 is determined by the size of the saw blade 8 and the desired hook angle of the saw teeth. Grinding wheel 9 is turned on and is brought forward against saw tooth 15 to the predetermined depth desired for gullet 16 by holding arm 2 tight against stop 13. Now holding forearm 5 so that key 6 is riding against key guide 14, forearm 5 and circular saw blade 8 are rotated together in a direction clockwise with key 6 riding against key guide 14 so that a small portion of the back edge of tooth 17 is ground away. Now again holding forearm 5 so that key 6 is riding against key guide 14, forearm 5 and saw blade 8 are rotated together in a counter-clockwise direction to grind away the remainder of the back edge of saw tooth 17 to precisely and accurately shape the back edge of saw tooth 17 and gullet 16. In addition, grinding the back edge of saw tooth 17 in a counter-clockwise direction accurately joints the saw teeth so saw tooth 17 is the exact height of the other saw teeth. It is important not to grind too much of the saw tooth at one time and is preferable when gumming and shaping to go around the saw blade several times. Grinding away too much of the saw tooth at one time will heat the gullets and stretch the rim so that the saw blade will need hammering to restore the original tension. Furthermore, grinding too deep a cut, especially when shaping the back edge of the saw teeth in a clockwise direction, so that the tip or gullet is blued and burned, the saw is likely to be injured and will appear to be glazed and so hard that a file will make no impression. This is crystalization of the steel and small cracks will begin and become dangerous fractures. If the points of the teeth are badly burned they are liable to break off or crumble in hard sawing. Further illustration of the operation of this device include the following steps: (1) after installing saw blade 8 on clamp 20, adjust arm 2 by means of bolt 3 is slot 4 for the proper hook angle of the saw teeth, for instance, 20° or 30° as illustrated in FIGURE 1; (2) starting at the top of saw tooth 15, pull grinding wheel 9 into the saw blade the exact depth desired and set stop 13 in stop fastener 11 and set a finer adjustment of the exact depth by means of bolt 12 in slot 10, being careful to maintain guide 11 at right angles to arm 2; (3) using both hands and holding saw blade 8 tight against forearm 5 so that key 6 is riding against key guide 14, forearm 5 and saw blade 8 are rotated together in a counter clockwise direction grinding the backside of saw tooth 17 to the exact curvature desired depending upon the diameter of key 6. Key guide 14 is set closer to the grinding wheel 9 for a smaller size of saw blade 8 and likewise the size of key 6 is smaller in diameter for smaller saw blades.

Referring now to FIGURE 2, the apparatus of the present invention is shown in side view to better illustrate the assembly of the various parts. Base plate 1 has installed thereon arm 2 by means of hand bolt 3 with a sliding contact point at the opposite end of arm 2 from the bolted portion. Forearm 5 is rotatably attached to arm 2 (see FIGURE 3) and circular saw blade 8 is firmly forced against the top of forearm 5 by cone 21, clamp 20 and set screw 23, all in axial relationship to shaft 22. Key guide 14 is shown fastened to base plate 1 as is adjustable stop fastener 11 on which stop 13 is adjustably attached.

Referring now to FIGURE 3, arm 2, forearm 5 with key 6 attached thereto, stop fastener 11, and stop 13 are illustrated clearly in isometric views. Rotatable socket 19 by which arm 2 and forearm 5 are engaged is likewise illustrated in detail.

From the foregoing it will be readily apparent that there has been devised a circular saw blade jointing, gumming and shaping apparatus which provides for correct, accurate and precise jointing, gumming and shaping of the face, gullet and back edge of the saw teeth of a circular saw blade. From this explanation, the construction and operation of the apparatus will be readily understood and further explanation is believed to be unnecessary. However, since numerous modifications and changes will occur to those skilled in the art, it is not desired to limit the invention to the exact construction shown and described and accordingly all suitable modifications and equivalents may be resorted to within the scope of the appended claims.

The size of circular saw blades on which the saw teeth may be jointed, gummed and shaped may vary from about four inches in diameter to about eighteen inches in diameter.

The manner in which the grinding machine may be designed to move forward and backward on its base may vary considerably so long as it can be brought forward to a relatively stable position and pushed back to a stable position and the distance moved is sufficient to grind the gullet of the saw teeth to the desired depth, for instance, from about ¼ inch to about 1½ inches.

The shape and size of key 6 attached to forearm 5 may be any of many various shapes and sizes depending on what shape is desired for the back edge of the circular saw teeth. Whatever curvature the key has will be precisely followed in shaping the back edge of the saw teeth providing the key is held firmly against the key guide during the grinding of the back edge of the saw teeth. A semi-circular shape is preferred for the key and a diameter of from 1 to about 4 inches is preferred.

The apparatus may be easily adjusted for any hook, or angle with the diameter, for the face of the saw teeth. The hook is determined by the angle between a line from the gullet of the saw tooth through the center of the saw blade and a line from the gullet of the saw tooth parallel with the grinding wheel. This angle is illustrated in FIGURE 1 and may be from 0 degrees to about 45 degrees but is preferably from about 10 degrees to about 30 degrees.

I claim:

1. An apparatus for jointing, gumming and shaping the saw teeth of a circular saw blade which comprises in combination a portable base plate; adapted to be clamped into position at a location adjacent to a powered driven grinding wheel; a circular saw blade supporting structure mounted on said base plate and including an elongated first arm adjustably attached at one end thereof to said base plate and rotatably attached at the other end thereof to an elongated second arm, said second arm having a semi-circular key piece attached thereto in a plane parallel to said base plate and at the other end of said second arm from the said rotatable attachment to said first arm, and means for clamping the center of said circular saw blade at the point of attachment between said first arm and said second arm; a guide pin attached to said base plate in a position normal to the plane of said base plate and located adjacent to said key piece; adjustable means for stopping the movement of said first arm toward said grinding wheel at a predetermined position; means for supporting the perimeter of said circular saw blade on said base plate during grinding of the teeth of said circular saw blade by said grinding wheel at the point of contact between the said saw blade and said grinding wheel.

2. The apparatus of claim 1 wherein the diameter of said key piece is from one inch to about four inches.

3. The apparatus of claim 1 wherein the means for clamping the center of said circular saw blade is a cone to force said circular saw blade against said second arm, a clamp with a set screw to hold said cone in place, and a shaft attached to said first arm which is positioned so that said circular saw blade, said cone, and said clamp are in axial relationship thereto.

No references cited.

GRANVILLE Y. CUSTER, JR., *Primary Examiner.*